United States Patent
Nandi et al.

(10) Patent No.: US 7,711,677 B1
(45) Date of Patent: May 4, 2010

(54) DYNAMIC DISCOVERY OF ATTRIBUTES OF STORAGE DEVICE DRIVER CONFIGURATION

(75) Inventors: Siddhartha Nandi, Maharashtra (IN); Anuj Garg, Santa Clara, CA (US)

(73) Assignee: Symantec Operating Corporation, Mountain View, CA (US)

( * ) Notice: Subject to any disclaimer, the term of this patent is extended or adjusted under 35 U.S.C. 154(b) by 543 days.

(21) Appl. No.: 10/208,763

(22) Filed: Jul. 30, 2002

(51) Int. Cl.
*G06F 17/30* (2006.01)
(52) U.S. Cl. ....................................... 707/3
(58) Field of Classification Search ............... 707/1–10, 707/100, 104.1; 709/223, 321, 345; 711/103–104
See application file for complete search history.

(56) References Cited

U.S. PATENT DOCUMENTS

| | | | |
|---|---|---|---|
| 5,761,529 A * | 6/1998 | Raji et al. ..................... 710/4 |
| 6,438,643 B1 * | 8/2002 | Ohara et al. ................. 711/103 |
| 2002/0129230 A1 * | 9/2002 | Albright et al. ................ 713/1 |
| 2003/0132956 A1 * | 7/2003 | Duncan et al. .............. 345/735 |
| 2003/0135663 A1 * | 7/2003 | Duncan et al. .............. 709/321 |
| 2003/0163476 A1 * | 8/2003 | Lanzatella et al. .......... 707/100 |
| 2003/0204532 A1 * | 10/2003 | Maslowski .................. 707/200 |
| 2004/0030768 A1 * | 2/2004 | Krishnamoorthy et al. .. 709/223 |

* cited by examiner

*Primary Examiner*—Charles Rones
*Assistant Examiner*—Mellissa M Chojnacki
(74) *Attorney, Agent, or Firm*—Campbell Stephenson, LLP

(57) ABSTRACT

A method, computer program product and system that enables dynamic determination of device attributes and dynamic configuration of device drivers for storage devices in a heterogeneous storage environment. Attributes of a device are dynamically determined by an application program, and those attributes are used by the application program to configure the device driver. The application program and the storage device being configured remain operational during the reconfiguration process.

20 Claims, 6 Drawing Sheets

DYNAMIC DISCOVERY OF ATTRIBUTES OF STORAGE DEVICE DRIVER CONFIGURATION

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

As businesses increasingly rely on computers for their daily operations, managing the vast amount of business information generated and processed has become a significant challenge. Most large businesses have a wide variety of application programs managing large volumes of data stored on many different types of storage devices across various types of networks and operating system platforms. These storage devices can include tapes, disks, optical disks, and other types of storage devices and often include a variety of products produced by many different vendors. Each product typically is incompatible with the products of other vendors. Because of these complexities in managing a heterogeneous storage environment, specialized storage management applications have been developed to assist network and information administrators in managing storage resources.

Storage devices have become increasingly sophisticated, providing such capabilities as allowing input and output to be scheduled through multiple paths to a given disk within a disk array. Such disk arrays are referred to herein as multi-path arrays. Often, vendors of storage devices provide their own application programming interfaces (APIs) and/or command line utilities for using the specialized features of their own storage devices, but these APIs and command line utilities are not compatible from vendor to vendor. Implementing the ability to use these features in application programs, such as storage management applications, is complicated by the fact that detailed attribute information from the storage device is needed. For example, to make use of a multi-path disk array, the type of the disk array is needed. This attribute information is typically not available to an application program, because it is not used by, and therefore not available from, the underlying operating system.

Typically, the storage devices available to a host computer system are determined at boot time by the operating system. Determining that a new device has been added or providing a modified driver for a storage device requires rebooting the host computer system or using an operating system command line utility. These operating system operations typically require shutting down application programs running on the host system, including storage management applications, thereby disrupting business operations. With today's 24×7 operating environments, such shutdowns can be very costly. The ability to make configuration changes to storage environments dynamically while application programs are running is needed.

For example, to add a new type of storage device to a storage environment, a vendor of a storage management application often must modify an existing version of the storage management application code, as well as add a new storage device driver or modify an existing storage device driver. The new storage device is tested by storage management application vendor personnel and incorporated into a later release of the storage management application.

This process for making new storage devices available has proven costly for vendors of storage management applications, as support for each new storage device requires a new release, a costly and time-consuming project. Furthermore, the release process has proven untimely for the vendors of storage devices, as support for their products depends upon the release schedules for storage management applications in which their products are used, slowing time to market for storage devices.

What is needed is the ability to dynamically add or modify support for a storage device in a storage management application.

SUMMARY OF THE INVENTION

The present invention relates to a method, system, application programming interface, and computer program product that enable dynamic determination of device attributes and dynamic configuration of device drivers for storage devices in a heterogeneous (e.g., multi-vendor) storage environment. Attributes of a device are dynamically determined by an application program, and those attributes are used by the application program to configure the device driver. The application program and the storage device being configured remain operational during the configuration process.

In one feature, a method includes defining a first command of an application programming interface definition, wherein the first command dynamically discovers an attribute of a storage device. The method can further include defining a second command to determine a device support library that claims the storage device.

In another feature of the invention, a system includes discovering means for dynamically discovering an attribute of a storage device. The system can further include configuring means for dynamically configuring a driver for the storage device using the attribute.

In another feature of the invention, a computer program product includes discovering instructions to dynamically discover an attribute of a storage device and a computer-readable medium to store the discovering instructions.

In another feature of the invention, a system includes a dynamic discovery component to dynamically discover an attribute of a storage device, and a dynamic configuration component to dynamically configure a driver for the storage device using the attribute. The system can further include an application programming interface definition comprising a command to enable an application to determine a device support library that the application can call to configure the driver.

In another feature of the invention, an application programming interface definition includes a first definition for a command to dynamically discover an attribute of a storage device. The application programming interface definition can further include a second definition for a command to determine a device support library that claims the storage device.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The present invention provides a method, system, computer program product, and application programming interface definition for discovering storage device attributes and dynamically configuring a device driver for the storage device.

The present invention is explained herein in terms of providing support for multi-path disk arrays, although the invention is also useful for supporting disk arrays that have only a single path. Multi-path disk arrays are used to illustrate the usefulness of the invention, although one of skill in the art will recognize that the invention is not limited to support for multi-path disk arrays. In contrast, the invention can be used for any type of storage device for which the operating system cannot provide information about the detailed attributes needed to dynamically configure a device driver to use the storage device.

Figure 1:
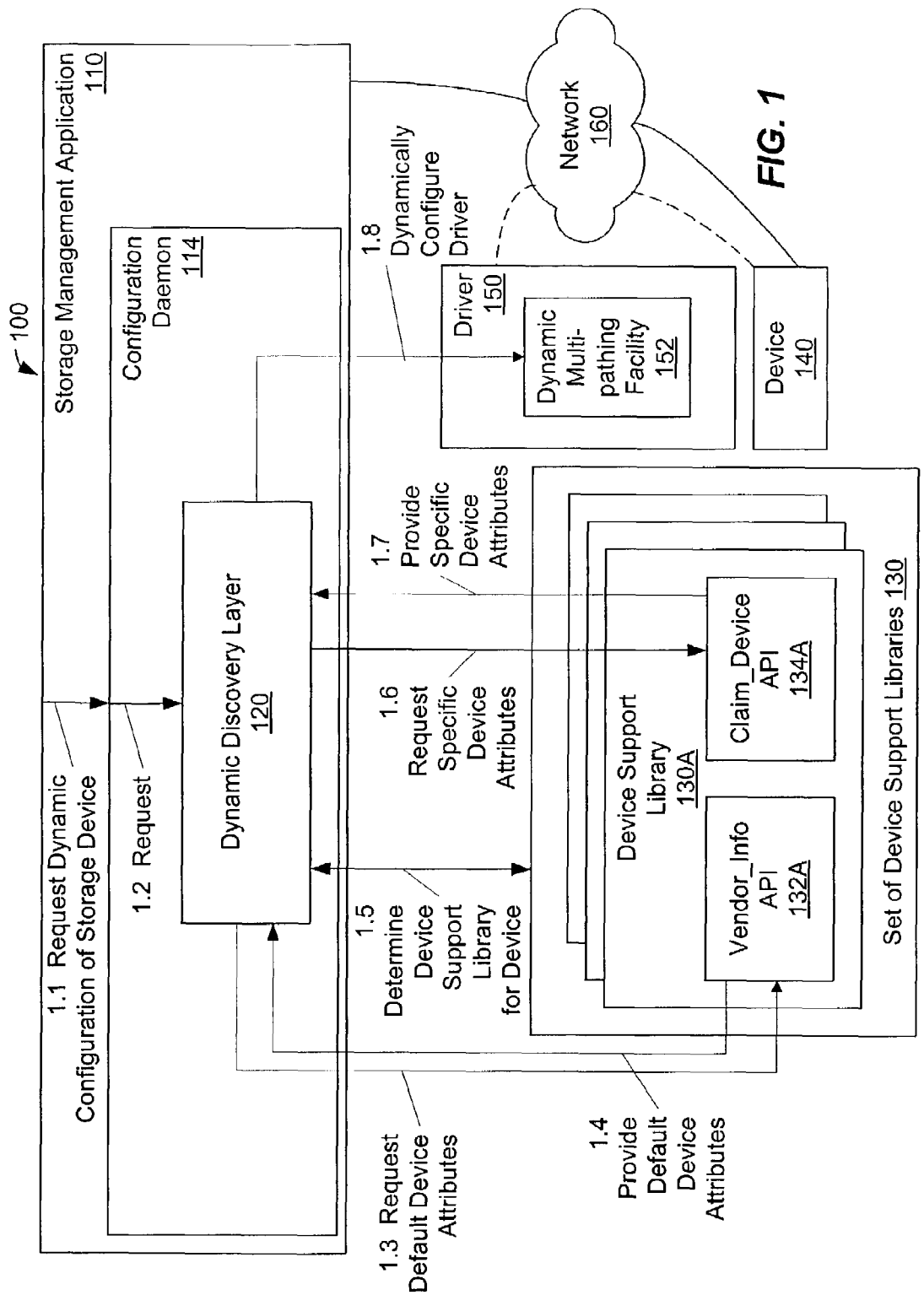
FIG. 1 provides an example of a storage environment that operates in accordance with the present invention.

FIG. 1 provides an example of a storage environment 100 that operates in accordance with the present invention. Storage environment 100 includes storage management application 110, dynamic discovery layer 120, a set of device support libraries 130, an example storage device 140, and a corresponding device driver 150. Storage management application 110 provides support for heterogeneous storage environment 100 having multiple storage devices, such as storage device 140, provided by different storage device vendors. Storage device 140 is connected via a network 160 to a host computer system (not shown) hosting storage management application 110. In the example shown, storage device 140 is described as a disk array including multiple disks having multiple paths, although storage device 140 generally represents other types of storage devices as well. Storage device 140 is shown as connected to device driver 150 via network 160, although storage device 140 may be directly connected to device driver 150.

Dynamic discovery layer 120 is a service provided to a configuration daemon 114 of storage management application 110. Configuration daemon 114 corresponds to a process responsible for discovering the attributes of storage devices, such as multi-path attributes of disks and disk arrays. Configuration daemon 114 also discovers enclosure information, if available, from the disk arrays. The enclosure attribute can be used by storage management application 110 to determine an appropriate storage device in which to store data and/or metadata.

In one embodiment, dynamic discovery layer 120 uses SCSI commands to discover attributes of different disk arrays. Since the procedure to discover different attributes is different for different types of storage devices, dynamic discovery layer 120 uses a set of device support libraries 130. Each device support library in set of device support libraries 130 is a storage device-specific dynamically loadable library.

Dynamic discovery layer 120 gathers attributes of the storage devices connected to a host through device support libraries, such as device support library 130A, and configures a driver 150 for a storage device, such as storage device 140, so that storage management application 110 can access and use the device. Configuration of driver 150 enables features, such as multiple paths, within corresponding device 140 to be used for input and output.

Dynamic discovery layer 120 enables device support layers, such as device support library 130A, to be added or removed from a running storage management application, such as storage management application 110. Support for a particular type of storage device may be added (or removed) dynamically from storage management application 110 without stopping storage management application 110 or rebooting the host system. If a disk array contains active volumes, the disk volumes remain available during and after the addition or removal of the support. No change to the code for storage management application 110 is needed to add or remove support for a type of storage device.

In one embodiment, dynamic discovery layer 120 supports both Active/Active (A/A) arrays that support simultaneous inputs and outputs on the paths and Active/Passive (A/P) arrays that allow inputs and outputs on the primary (active) path. The secondary (passive) path is used upon failure of the primary path.

Examples of attributes to support a multi-path disk array are provided below:

Vendor ID

Product ID

Enclosure Serial Number—Unique identification of the Disk Array Enclosure. Also referred to as Cabinet Serial Number.

LUN Serial Number—Unique identification of a device within a disk array enclosure.

Disk Array Type—Identifies the type of path switching policy to be followed, for example, by Dynamic Multipathing Facility 152.

The above set of attributes applies for disk arrays generally. For A/P arrays, an example of an additional attributes includes the following:

LUN Ownership—Determines which LUN is the primary path for the input and output.

Actions 1.1 through 1.7 of FIG. 1 are described below.

Figure 2:
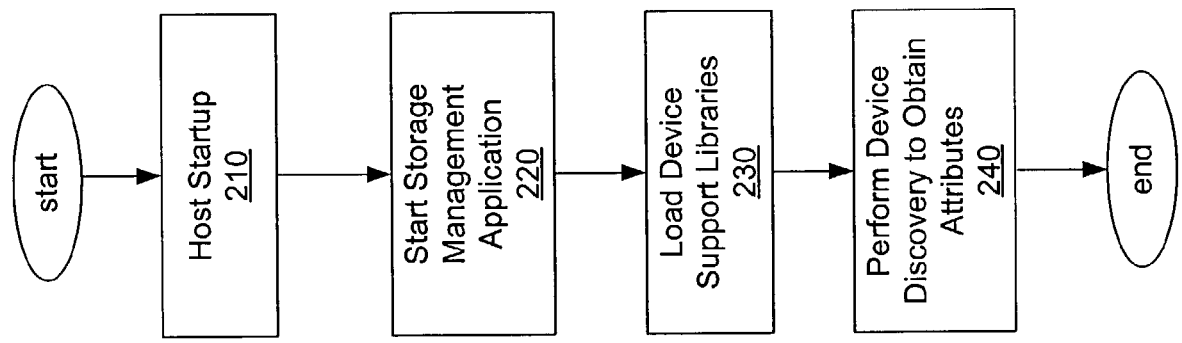
FIG. 2 is a flowchart of the actions taken upon startup of a host computer system in the storage environment of FIG. 1.

Referring to FIG. 2, a flowchart is shown of the actions taken upon startup of a host computer system in storage environment 100, such as the host (not shown) for storage management application 110. Upon host startup, represented by Host Startup step 210, a storage management application, such as storage management application 110, can be started, as shown in Start Storage Management Application step 220. In Load Device Support Libraries step 230, dynamic discovery layer 120 loads each device support library, such as device support library 130A, in set of device support libraries 130, so that the storage management application can access all supported types of storage devices. In Perform Device Discovery to Obtain Attributes step 240, attributes for each supported device are determined. Perform Device Discovery to Obtain Attributes step 240 is described in further detail with reference to FIG. 4.

Figure 3:
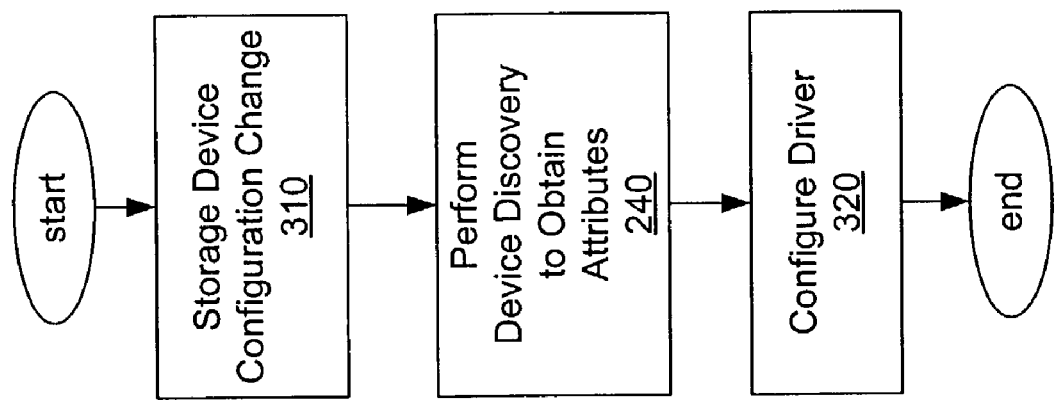
FIG. 3 is a flow chart of the actions taken in response to a storage configuration change in the storage environment of FIG. 1.

FIG. 3 is a flow chart of the actions taken in response to a storage configuration change in storage environment 100. Upon a storage device configuration change, as shown in Storage Device Configuration Change 310, control transitions to Perform Device Discovery to Obtain Attributes step 230. Note that Perform Device Discovery to Obtain Attributes step 240 of FIG. 2 is also performed upon a storage device configuration change. Once the attributes are obtained, in Configure Driver step 320, the driver for the storage device, such as driver 150 for storage device 140 of FIG. 1, is configured. For example, a new driver can be added, an existing driver can be removed, or an existing driver can be updated, i.e., removed and replaced with a more current version.

Figure 4:
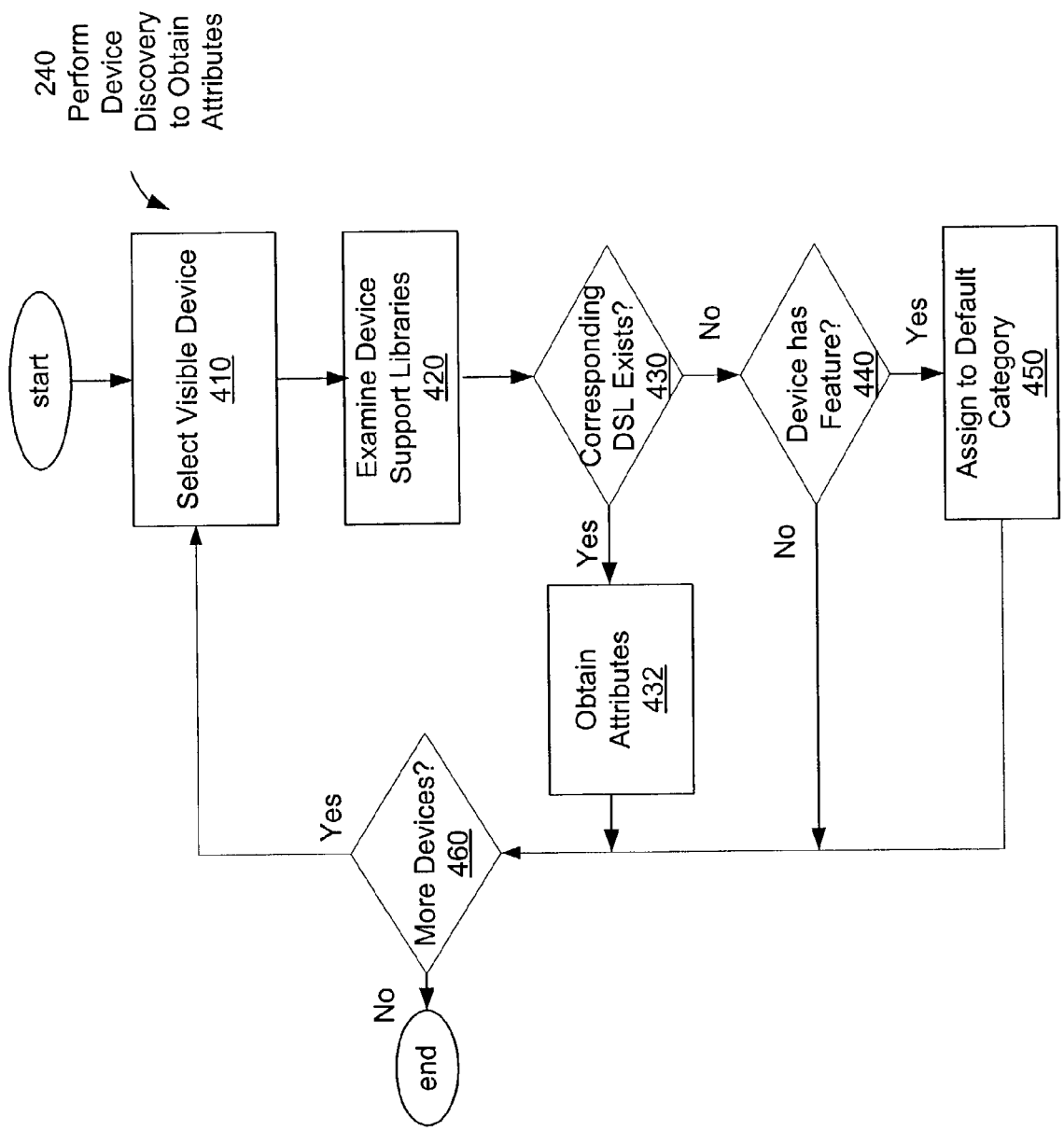
FIG. 4 is a flow chart of the actions taken to discover device attributes in accordance with the present invention.

FIG. 4 is a flow chart of the actions taken to discover device attributes. Attributes for each device available to the host system are determined. In step 410, a storage device visible to the host system is selected to determine that device's attributes. In step 420, the device support libraries, such as the device support libraries making up set of device support libraries 130, are each examined to determine whether one of the device support libraries supports the selected storage device. For example, for each storage device visible to the host operating system, dynamic discovery layer 120 can use the functions available from the device support libraries, such as claim_device API 134A of device support library 130A, to discover the corresponding device support library for that storage device. In one embodiment, claim_device API 134A accepts as input a name of a given storage device and returns a value of "claimed" if the given storage device is supported by the device support library. Dynamic discovery layer 120 invokes the corresponding claim_device API for each device support library until one of the device support libraries returns a value of "claimed." If a device support library does not correspond to a storage device, the device support library returns a value of "unclaimed."

After all device support libraries are checked, control proceeds to Corresponding DSL Exists decision point 430. If a device support library claims the device, control proceeds to Obtain Attributes step 432, where the attributes are obtained from the device support library and provided to, for example, dynamic discovery layer 120 for use by storage management application 110. For example, a call to vendor_info API 132A of device support library 130A returns attribute information, such as the information needed to find different input/output paths for a given disk in a disk array. Vendor_info API 132A also returns information specific to the disk array, such as LUN ownership information for an A/P array. In one embodiment, obtain_vendor_info API 132A returns name/value pairs to enable a variable set of disk attributes to be returned.

From Obtain Attributes step 432, control proceeds to More Devices decision point 460, which is described in further detail below.

If no device support library is found in Corresponding DSL Exists decision point 430 (in the example above, no device support library has returned a value of "claimed"), control proceeds to Device has Feature decision point 440. Device has Feature decision point 440 represents the contingency that a particular storage device visible to a host may not possess the feature for which dynamic attribute discovery is needed. For example, a particular disk array may not support multiple paths to a storage device and would not need a corresponding dynamic support library. If at Device has Feature decision point 440, the visible device does not have the feature, control returns to More Devices decision point 460 to determine whether additional devices are visible to the host system.

If at Device has Feature decision point 440, the visible device has the feature, no corresponding device support library has been found and the device can be assigned to a default category in Assign to Default Category step 450. For example, in one embodiment, if no device support library can be found to claim a particular disk array, the disk array can be assigned to a JBOD ("just a bunch of disks") category. This categorization is made when more than one path can be found to the disk array. In such a situation, a particular disk array may have a unique disk serial number that can be obtained using SCSI commands, such as the inquiry command or the mode_sense command. A default device support library may be established to support JBOD devices, or an alternative set of default attributes may be assumed.

After Assign to Default Category step 450, control transitions to More Devices decision point 460, where a determination is made whether additional storage devices are visible to the host system. If so, control transitions back to Select Visible Device step 410, where another visible device is selected. If not, device discovery is completed for the particular host of interest.

Returning to FIG. 1, actions 1.1 through 1.7 illustrate the operation of the components of storage environment 100 in obtaining storage device attributes and configuring a device driver for the storage device dynamically. In action 1.1, storage management application 110 requests dynamic configuration of a given storage device, in this example, storage device 140. In action 1.2, the request is passed to dynamic discovery layer 120.

In action 1.3, dynamic discovery layer 120 requests default device attributes of the given storage device from set of device support libraries 130. A device support library within set 130 is queried in action 1.3 to determine the corresponding device support library for the given device, here storage device 140. For example, as described above, a corresponding vendor_info API, such as vendor_info API 132A of device support library 130A, may be used to query each device support library. When the corresponding device support library is determined, the corresponding vendor_info API is used to obtain the default device attributes applicable to storage devices of the type of the given storage device 140.

In action 1.4, vendor_info API 132A provides the default device attributes back to dynamic discovery layer 120. Using the default device attributes, a specific device support library supporting device 140 is determined in action 1.5. In action 1.6, the specific device support library is queried using claim_deviceAPI 134A to determine specific attributes applicable to the given storage device 140. In action 1.7, the specific attributes are provided to dynamic discovery layer 120. In action 1.8, configuration daemon 114 uses the device attributes to dynamically configure a driver, such as driver 150, for the storage device. Configuration of driver 150 may include adding information to, or updating, dynamic multi-pathing facility 152.

In one embodiment, an administrative utility is provided for adding, removing or listing the types of storage devices supported. The administrative utility supports dynamic reconfiguration of array libraries for participating in device discovery.

In one embodiment, some attributes may be set by both the vendor_info and the claim_device functions. When both the functions try to set the same attribute, claim_device( ) takes priority. Vendor_info( ) may set the default attributes of the disks belonging to the array, while claim_device( ) may dynamically change these depending on how the array is configured. For example, consider a library which handles a series of similar disk arrays, some of which are A/P and some A/A. The function vendor_info( ) may set the default attributes of such arrays to be A/P, while claim_device( ) may dynamically discover that the array is configured as A/A type and set the ATYPE attribute accordingly. Dynamic discovery layer 120 manages the array as an A/A array. A similar array may still be found as of the default type, and the claim_device( ) may not pass ATYPE attribute back to dynamic discovery layer 120. Such an array will be treated as A/P array by dynamic discovery layer 120.

In a particular embodiment, storage management application 110 allows operating system-independent naming of disks. The name is generated from an array specific string and an instance number of the array. The string prefix may be supplied by the corresponding dynamic support library through the attribute ANAME.

In one embodiment, a special attribute NR_DEVICE is used to force dynamic discovery layer 120 to invoke claim_device( ) before issuing any SCSI command on the device. This attribute is useful for the arrays where the normal SCSI command (generally accompanied by test-unit-ready command) is not advisable for all devices within an array.

In an embodiment, a TPD_CONTROLLED attribute is set to indicate that the disk array is controlled by third party driver. If such a driver suppresses the multiple paths to the device, then a TPD_SUPPRESSED attribute also is set.

Operations discussed herein may consist of (or be initiated by) directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be implemented as modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the actions described herein may be executed by a module (e.g., a software module) or a portion of a module or a computer system user using, for example, a computer system such as the storage router previously mentioned, or a similar network element. Thus, the above described method, the operations thereof and modules thereof may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following computer readable storage media: magnetic storage media including disk and tape storage media, optical storage media such as compact disk media (e.g., CD-ROM, CD-R, etc.) and digital video disk storage media, nonvolatile memory storage memory including semiconductor-based memory units such as FLASH memory, EEPROM, EPROM, ROM or application specific integrated circuits, volatile storage media including registers, buffers or caches, main memory, RAM, etc. In a UNIX-based embodiment, the software modules may be embodied in a file which may be a device, a terminal, a local or remote file, a socket, a network connection, a signal, or other expedient of communication or state change. Other new and various types of computer-readable storage media may be used to store the software modules discussed herein. An example of such a computer system is computer system 510 of FIG. 5 described below.

An Example Computing and Network Environment

Figure 5:
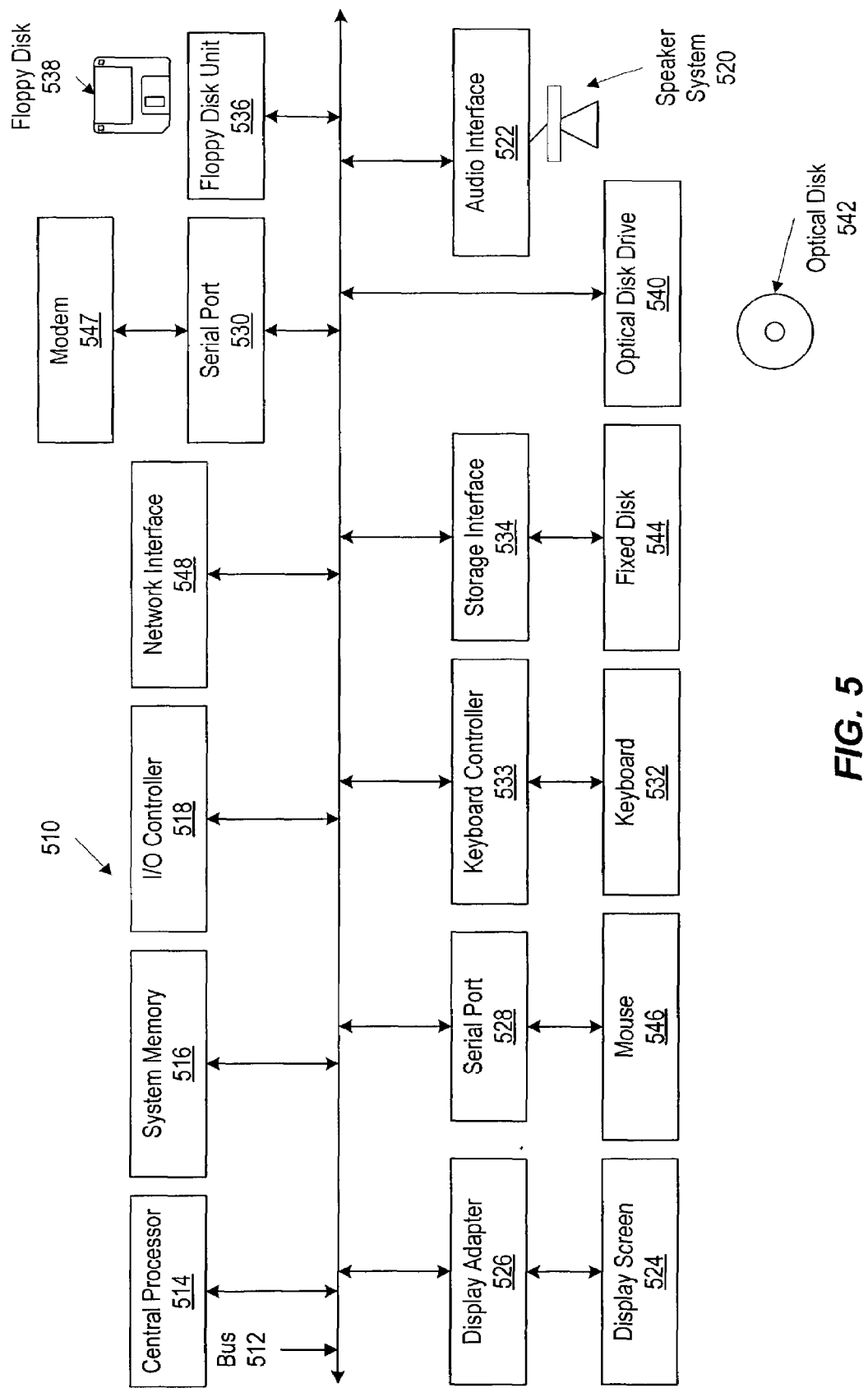
FIG. 5 is a block diagram illustrating a computer system suitable for implementing embodiments of the present invention.

FIG. 5 depicts a block diagram of a computer system 510 suitable for implementing the present invention. Computer system 510 includes a bus 512 which interconnects major subsystems of computer system 510 such as a central processor 514, a system memory 516 (typically RAM, but which may also include ROM, flash RAM, or the like), an input/output controller 518, an external audio device such as a speaker system 520 via an audio output interface 522, an external device such as a display screen 524 via display adapter 526, serial ports 528 and 530, a keyboard 532 (interfaced with a keyboard controller 533), a storage interface 534, a floppy disk drive 536 operative to receive a floppy disk 538, and a CD-ROM drive 540 operative to receive a CD-ROM 542. Also included are a mouse 546 (or other point-and-click device, coupled to bus 512 via serial port 528), a modem 547 (coupled to bus 512 via serial port 530) and a network interface 548 (coupled directly to bus 512).

Bus 512 allows data communication between central processor 514 and system memory 516, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., fixed disk 544), an optical drive (e.g., CD-ROM drive 540), floppy disk unit 536 or other storage medium. Additionally, applications may be in the form of electronic signals modulated in accordance with the application and data communication technology when accessed via network modem 547 or interface 548.

Storage interface 534, as with the other storage interfaces of computer system 510, may connect to a standard computer readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 5 to be present to practice the present invention. The devices and subsystems may be interconnected in different ways from that shown in FIG. 5. The operation of a computer system such as that shown in FIG. 5 is readily known in the art and is not discussed in detail in this application. Code to implement the present invention may be stored in computer-readable storage media such as one or more of system memory 516, fixed disk 544, CD-ROM 542, or floppy disk 538. Additionally, computer system 510 may be any kind of computing device, and so includes personal data assistants (PDAs), network appliance, X-window terminal or other such computing device. The operating system provided on computer system 510 may be MS-DOS®, MS-WINDOWS®, OS/2®, UNIX®, Linux® or other known operating system. Computer system 510 also supports a number of Internet access tools, including, for example, an HTTP-compliant web browser having a JavaScript interpreter, such as Netscape Navigator® 8.0, Microsoft Explorer® 8.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 510). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 6:
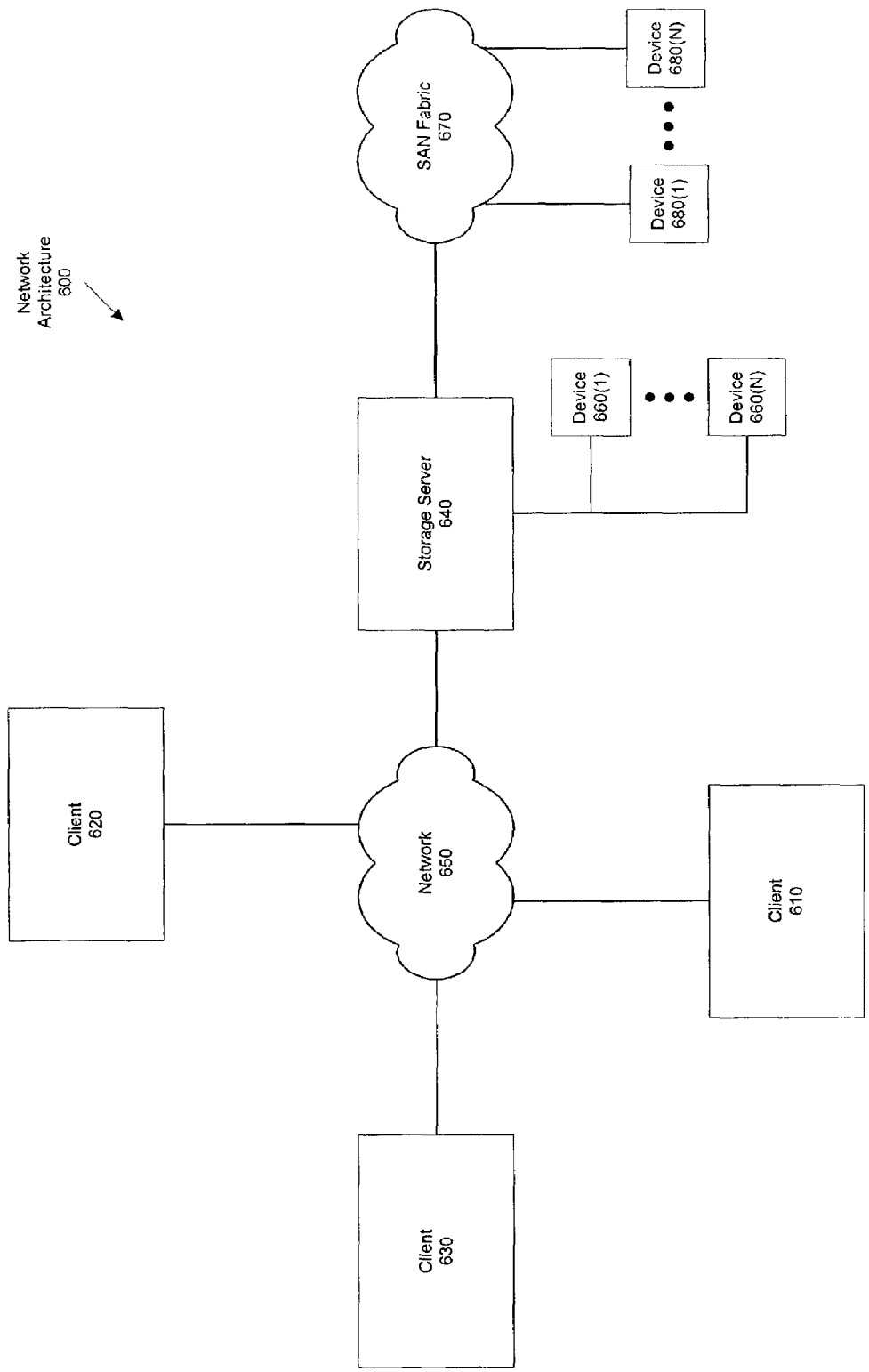
FIG. 6 is a block diagram illustrating a network environment in which dynamic configuration of device drivers according to embodiments of the present invention may be practiced.

FIG. 6 is a block diagram depicting a network architecture 600 in which client systems 610, 620 and 630, as well as a storage server 640 (any of which can be implemented using computer system 510), are coupled to a network 650. Storage server 640 is further depicted as having storage devices 660(1)-(N) directly attached thereto. Storage server 640 is also connected to a SAN fabric 670, although connection to a storage area network is not required for operation of the invention. SAN fabric 670 supports access to storage devices 680(1)-(N) by storage server 640, and so by client systems 610, 620 and 630 via network 650.

With reference to computer system 510, modem 547, network interface 548 or some other method can be used to provide connectivity from computer system 510 to network 650. Client systems 610, 620 and 630 are able to access information on storage server 640 using, for example, a web browser or other client software (not shown). Such a client allows client systems 610, 620 and 630 to access data hosted by storage server 640 or one of storage devices 660(1)-(N) or 680(1)-(N). FIG. 6 depicts the use of a network such as the Internet for exchanging data, but the present invention is not limited to the Internet or any particular network-based environment.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A computing-device-implemented method comprising:
   receiving, from a storage management application, a request for dynamic configuration of a driver for a storage device, wherein the receiving is performed by a computing device comprising the storage management application and a dynamic discovery layer, wherein the computing device is coupled to the storage device via a network, and wherein the storage device is a multi-path disk array;
   providing a name of the storage device to each of a plurality of device support libraries;
   in response to the providing, receiving an indication that a device support library of the device support libraries claims the storage device;
   in response to the receiving the indication, obtaining an attribute of the storage device from the device support library that claims the storage device, wherein the attribute comprises a multi-path attribute of the multi-path disk array; and dynamically configuring a driver for the storage device, based upon the attribute, wherein the dynamically configuring the driver comprises updating the driver, and wherein the dynamically configuring allows the storage management application to use multiple paths of the multi-path disk array for input and output.

2. A computer program product comprising:

receiving instructions to receive, from a storage management application, a request for dynamic configuration of a driver for a storage device, wherein the storage device is a multi-path disk array;

providing instructions to provide a name of the storage device to each of a plurality of device support libraries, wherein
the providing instructions are executable to query each of the plurality of device support libraries;

instructions to receive an indication that a device support library of the device support libraries claims the storage device, in response to providing the name to the device support libraries;

obtaining instructions to obtain an attribute of the storage device from the dynamic support library that claims the storage device, in response to receiving the indication, wherein the attribute comprises a multi-path attribute of the multi-path disk array;

configuring instructions to dynamically configure a driver for the storage device, based upon the attribute, wherein dynamically configuring the driver comprises updating the driver, and wherein dynamically configuring the driver allows the storage management application to use multiple paths of the multi-path disk array for input and output; and a computer-readable storage medium to store the receiving instructions, the identifying instructions, the obtaining instructions and the configuring instructions.

3. A system comprising:

a computing device comprising: a processor; and a memory, wherein the memory is configured to store program instructions executable by the processor to implement a dynamic discovery layer and a storage management application, wherein the dynamic discovery layer is configured to:

receive a request, from the storage management application, for dynamic configuration of a driver for a storage device, wherein the computing device is coupled to the storage device via a network, and wherein the storage device is a multi-path disk array;

provide a name of the storage device to each of a plurality of device support libraries;

receive an indication that a device support library of the device support libraries claims the storage device, in response to providing the name to the device support libraries;

obtain an attribute of the storage device from the device support library that claims the storage device, in response to receiving the indication, wherein the attribute comprises a multi-path attribute of the multi-path disk array; and dynamically configure a driver for the storage device, based upon the attribute, wherein dynamically configuring the driver comprises updating the driver, and wherein dynamically configuring the driver allows the storage management application to use multiple paths of the multi-path disk array for input and output.

4. The system of claim 3 further comprising:
an application programming interface definition comprising a command to enable an application to identify the device support library that the application can call to configure the driver.

5. The method of claim 1 wherein the dynamically configuring the driver occurs while a host of the driver and an application managing the storage device are operational.

6. The method of claim 1, wherein
the attribute is assigned by the storage device; and
the attribute is inaccessible by an operating system interacting with the storage device.

7. The method of claim 1, wherein
the dynamically configuring the driver is performed by an application managing the storage device.

8. The method of claim 1, wherein
the dynamically configuring the driver is performed according to a device type of the storage device.

9. The method of claim 8, wherein
the dynamically configuring the driver adds the device type to a set of device types supported by the driver.

10. The method of claim 1, wherein
the dynamically configuring the multi-path disk array is performed according to an array type of the multi-path disk array.

11. The method of claim 1, wherein
the updating the driver comprises one of:
replacing the driver with a new driver,
updating the driver,
removing the driver,
adding functionality to the driver, and
removing functionality from the driver.

12. The method of claim 1, wherein
the obtaining the attribute is performed in response to the request.

13. The computer program product of claim 2, wherein the updating the driver comprises one of:
replacing the driver with a new driver,
updating the driver,
removing the driver,
adding functionality to the driver, and
removing functionality from the driver.

14. The computer program product of claim 2, wherein the obtaining the attribute is performed in response to the request.

15. The system of claim 3, wherein
the updating the driver comprises one of:
replacing the driver with a new driver,
updating the driver,
removing the driver,
adding functionality to the driver, and
removing functionality from the driver.

16. The system of claim 3, wherein
the obtaining the attribute is performed in response to the request.

17. The method of claim 1, wherein
a configuration daemon comprises the dynamic discovery layer.

18. The method of claim 1, wherein
the dynamic discovery layer obtains the attribute from the device support library.

19. The method of claim 1, wherein
the configuring the driver is initiated by the dynamic discovery layer.

20. The system of claim 3, wherein
a configuration daemon comprises the dynamic discovery layer.

* * * * *